US008699167B2

(12) United States Patent
Xia et al.

(10) Patent No.: US 8,699,167 B2
(45) Date of Patent: Apr. 15, 2014

(54) SYSTEMS AND METHODS FOR DATA DETECTION USING DISTANCE BASED TUNING

(75) Inventors: Haitao Xia, San Jose, CA (US); Weijun Tan, Longmont, CO (US); Nenad Miladinovic, Campbell, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 137 days.

(21) Appl. No.: 13/310,028

(22) Filed: Dec. 2, 2011

(65) Prior Publication Data
US 2012/0207201 A1    Aug. 16, 2012

Related U.S. Application Data

(60) Provisional application No. 61/443,369, filed on Feb. 16, 2011.

(51) Int. Cl.
G11B 5/035    (2006.01)
H03H 7/30     (2006.01)
H03H 7/40     (2006.01)
H03K 5/159    (2006.01)

(52) U.S. Cl.
USPC ............................................. 360/65; 375/232

(58) Field of Classification Search
None
See application file for complete search history.

(56) References Cited

U.S. PATENT DOCUMENTS

| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,523,903 A | 6/1996 | Hetzler |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |

(Continued)

FOREIGN PATENT DOCUMENTS

| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.
U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.

(Continued)

Primary Examiner — Regina N Holder
(74) Attorney, Agent, or Firm — Hamilton DeSanctis & Cha

(57) ABSTRACT

Various embodiments of the present invention provide systems and methods for data processing. As an example, a data processing circuit is disclosed that includes an equalizer circuit and a data detection circuit. The equalizer circuit is operable to filter a series of samples based at least in part on a filter coefficient and to provide a corresponding series of filtered samples. The data detection circuit includes: a core data detector circuit and a coefficient determination circuit. The core data detector circuit is operable to perform a data detection process on the series of filtered samples and to provide a most likely path and a next most likely path. The coefficient determination circuit operable to update the filter coefficient based at least in part on the most likely path and the next most likely path.

20 Claims, 7 Drawing Sheets

(56) References Cited

U.S. PATENT DOCUMENTS

| | | |
|---|---|---|
| 5,717,706 A | 2/1998 | Ikeda |
| 5,768,044 A | 6/1998 | Hetzler |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Katawani et al. |
| 6,748,034 B2 | 6/2004 | Hattori et al. |
| 6,757,862 B1 | 6/2004 | Marianetti, II |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman et al. |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greeberg et al. |
| 7,093,179 B2 | 8/2006 | Shea |
| 7,113,356 B1 | 9/2006 | Wu |
| 7,136,244 B1 | 11/2006 | Rothbert |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghaven et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghaven et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghaven et al. |
| 7,590,927 B1 | 9/2009 | Shih et al. |
| 7,702,989 B2 | 4/2010 | Graef et al. |
| 7,712,008 B2 | 5/2010 | Song et al. |
| 7,738,201 B2 | 6/2010 | Jin et al. |
| 7,752,523 B1 | 7/2010 | Chaichanavong |
| 7,801,200 B2 | 9/2010 | Tan |
| 7,802,163 B2 | 9/2010 | Tan |
| 2003/0063405 A1 | 4/2003 | Jin et al. |
| 2003/0081693 A1 | 5/2003 | Raghaven et al. |
| 2003/0087634 A1 | 5/2003 | Raghaven et al. |
| 2003/0112896 A1 | 6/2003 | Raghaven et al. |
| 2003/0134607 A1 | 7/2003 | Raghaven et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung |
| 2005/0111540 A1 | 5/2005 | Modrie et al. |
| 2005/0157780 A1 | 7/2005 | Werner et al. |
| 2005/0157822 A1* | 7/2005 | Khandekar et al. ........... 375/340 |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song |
| 2006/0176947 A1* | 8/2006 | Lim ............................ 375/232 |
| 2006/0195772 A1 | 8/2006 | Graef et al. |
| 2006/0210002 A1 | 9/2006 | Yang et al. |
| 2006/0248435 A1 | 11/2006 | Haratsch |
| 2006/0256670 A1 | 11/2006 | Park et al. |
| 2007/0011569 A1 | 1/2007 | Vila Casado et al. |
| 2007/0047121 A1 | 3/2007 | Elefeheriou et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0276156 A1 | 11/2008 | Gunnam |
| 2008/0301521 A1 | 12/2008 | Gunnam |
| 2008/0317112 A1* | 12/2008 | Oh et al. ...................... 375/232 |
| 2009/0185643 A1 | 7/2009 | Fitzpatrick et al. |
| 2009/0199071 A1 | 8/2009 | Graef |
| 2009/0235116 A1 | 9/2009 | Tan et al. |
| 2009/0235146 A1 | 9/2009 | Tan et al. |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghaven et al. |
| 2010/0042877 A1 | 2/2010 | Tan |
| 2010/0042890 A1 | 2/2010 | Gunnam |
| 2010/0050043 A1 | 2/2010 | Savin |
| 2010/0061492 A1 | 3/2010 | Noeldner |
| 2010/0070837 A1 | 3/2010 | Xu et al. |
| 2010/0150280 A1* | 6/2010 | Gutcher et al. ............... 375/341 |
| 2010/0164764 A1 | 7/2010 | Nayak |
| 2010/0185914 A1 | 7/2010 | Tan et al. |
| 2011/0075569 A1 | 3/2011 | Marrow et al. |
| 2011/0080211 A1 | 4/2011 | Yang et al. |
| 2011/0167246 A1 | 7/2011 | Yang et al. |
| 2012/0236428 A1* | 9/2012 | Xia et al. ..................... 360/32 |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 12/887,369, filed Sep. 21, 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.
U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.
U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.

(56) References Cited

OTHER PUBLICATIONS

U.S. Appl. No. 13/167,764, filed Jun. 24, 2011, Li, Zongwang, et al.
U.S. Appl. No. 13/167,771, filed Jun. 24, 2011, Li, Zongwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System Architectures: Synergies with Solid-State Disks" Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center Ny, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http://www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matrix in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR DATA DETECTION USING DISTANCE BASED TUNING

CROSS REFERENCE TO RELATED APPLICATIONS

The present application claims priority to U.S. Prov. Pat. App. No. 61/443,369 entitled "Systems and Methods for Data Detection Using Distance Based Tuning", and filed Feb. 16, 2011 by Xia et al. The entirety of the aforementioned application is incorporated herein by reference for all purposes.

BACKGROUND OF THE INVENTION

The present inventions are related to systems and methods for data detection, and more particularly to systems and methods for data detection optimization.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any data losses caused by various factors. In some cases, an encoding/decoding process is used to enhance the ability to detect a data error and to correct such data errors. As an example, a simple data detection and decode may be performed, however, such a simple process often lacks the capability to converge on a corrected data stream. The failure to converge may be due to a data detection process that is not optimized.

Hence, for at least the aforementioned reasons, there exists a need in the art for advanced systems and methods for data detection.

BRIEF SUMMARY OF THE INVENTION

The present inventions are related to systems and methods for data detection, and more particularly to systems and methods for data detection optimization.

Various embodiments of the present invention provided data processing circuits that include an equalizer circuit and a data detection circuit. The equalizer circuit is operable to filter a series of samples based at least in part on a filter coefficient and to provide a corresponding series of filtered samples. The data detection circuit includes: a core data detector circuit and a coefficient determination circuit. The core data detector circuit is operable to perform a data detection process on the series of filtered samples and to provide a most likely path and a next most likely path. The coefficient determination circuit operable to update the filter coefficient based at least in part on the most likely path and the next most likely path. In some instances of the aforementioned embodiments, the data processing circuit is implemented as part of a storage device or as part of a data transmission device. In various instances of the aforementioned embodiments, the data processing circuit is implemented in an integrated circuit. The core data detector circuit may be, but is not limited to, a Viterbi algorithm detector circuit or a maximum a posteriori detector circuit.

In some instances of the aforementioned embodiments, the coefficient determination circuit is operable to calculate a difference between the most likely path and the next most likely path. In such cases, updating the filter coefficient based at least in part on the difference between the most likely path and the next most likely path. In some cases, the difference between the most likely path and the next most likely path is an angle between the most likely path and the next most likely path. In one particular case, the coefficient determination circuit is operable to: compare the most likely path with an expected most likely path to determine that the most likely path is correct; and based upon the determination that the most likely path is correct, the coefficient determination circuit is further operable to increase the angle between the most likely path and the next most likely path. In such a case, the updated filter coefficient reflects the increase in the angle between the most likely path and the next most likely path. In another particular case, the coefficient determination circuit is operable to: compare the most likely path with an expected most likely path to determine that the most likely path is incorrect; and based upon the determination that the most likely path is incorrect, the coefficient determination circuit is further operable to decrease the angle between the most likely path and the next most likely path until the most likely path and the next most likely path are switched. In such a case, the updated filter coefficient reflects the decrease in the angle between the most likely path and the next most likely path. In one or more cases, the coefficient determination circuit is operable to: calculate a first error gradient value for the most likely path based on the difference between the most likely path and the next most likely path; and calculate a second error gradient value for the next most likely path based on the difference between the most likely path and the next most likely path. In such a case, the coefficient determination circuit may be further operable to calculate a first updated branch metric for the most likely path based on the first error gradient value, and calculate a second updated branch metric for the next most likely path based on the second error gradient value. In another such cases, the coefficient determination circuit may be further operable to: calculate a first updated variance for the most likely path based on the first error gradient value; and calculate a second updated variance for the next most likely path based on the second error gradient value. In yet another cases, the coefficient determination circuit may be further operable to: calculate an error gradient value based on the difference between the most likely path and the next most likely path; and calculate the filter coefficient based on the error gradient.

Other embodiments of the present invention provide methods for equalizer optimization that include: receiving a series of samples; performing an equalization on the series of samples to yield a series of filtered samples where the equalization is governed at least in part by a filter coefficient; performing a Viterbi algorithm data detection on the series of filtered samples to yield a most likely path and a next most likely path; calculating an angle between the most likely path and the next most likely path; comparing the most likely path with an expected most likely path to determine that the most likely path is correct; based upon the determination that the most likely path is correct, increasing the angle between the most likely path and the next most likely path; and calculating the filter coefficient based at least in part in the increased angle between the most likely path and the next most likely path.

Yet other embodiments of the present invention provide storage devices that include: a storage medium, a read head disposed in relation to the storage medium, an analog front end circuit, and a read circuit. The storage medium is operable to maintain information, and the read head is operable to sense the information and to provide an analog signal corresponding to the information. The analog front end circuit is operable to converter the analog signal into a corresponding series of digital samples. The read circuit includes: an equalizer circuit and a data detection circuit. The equalizer circuit includes a filter operable to filter the series of digital samples based at least in part on a filter coefficient and to provide a corresponding series of filtered samples. The data detection circuit includes a core data detector circuit and a coefficient determination circuit. The core data detector circuit is operable to perform a data detection process on the series of filtered samples and to provide a most likely path and a next most likely path. The coefficient determination circuit operable to update the filter coefficient based at least in part on the most likely path and the next most likely path.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data detection, and more particularly to systems and methods for data detection optimization.

Figure 1A:
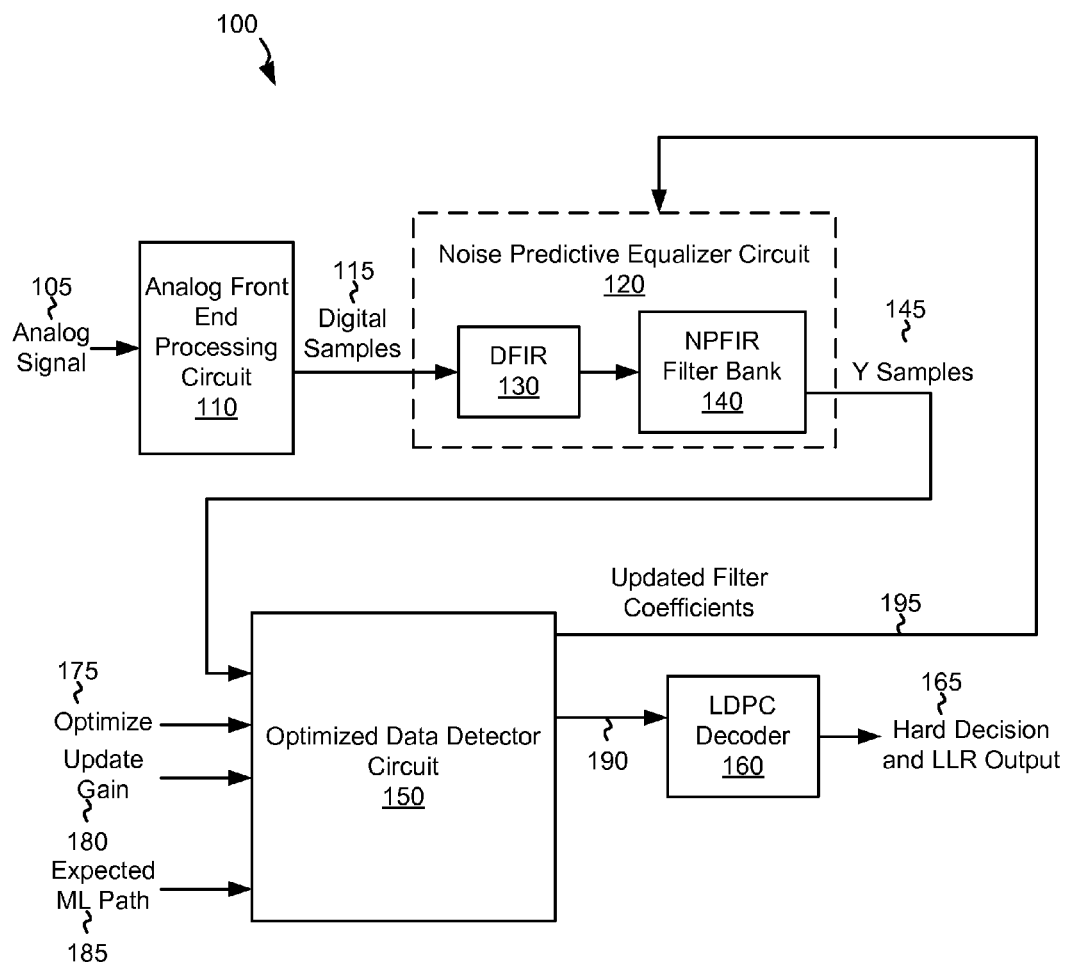
FIG. 1a depicts a data processing circuit including an optimized data detector circuit in accordance with some embodiments of the present invention.

Turning to FIG. 1a, a data processing circuit 100 including an optimized data detector circuit 110 is shown in accordance with some embodiments of the present invention. Data processing circuit 100 includes an analog front end processing circuit 110 that receives an analog signal 105 and provides a corresponding series of digital samples 115. Analog front end processing circuit 110 may include, but is not limited to, an analog filter and an analog to digital converter circuit as are known in the art. Based upon the disclosure provided herein, one of ordinary skill in the art will recognize a variety of circuitry that may be included as part of analog front end processing circuit 110.

Digital samples 115 are provided to a noise predictive equalizer circuit 120. Noise predictive equalizer circuit 120 is operable to filter digital samples 115 and to provide corresponding Y samples 145. The following equation (1) describes Y samples 145:

$$Y\ samples_i = \sum_{l=0}^{L} w_l x_{L-l}, \quad (1)$$

where $w_l$ is the tap coefficient (i.e., updated filter coefficient 195) of noise predictive equalizer circuit 120, and $x_{L-l}$ are digital samples 115.

The aforementioned filtering process reduces inter-symbol interference and suppresses channel noise to improve downstream data detector circuit performance. The applied filtering is governed at least in part by updated filter coefficients 195. In one particular embodiment of the present invention, noise predictive equalizer circuit 120 includes a digital finite impulse response filter 130 and a bank of noise predictive finite impulse response filters 140. Digital finite impulse response filter 130 may be any digital filter known in the art that is capable of receiving a series of digital samples and providing a corresponding series of filtered samples. The filtering applied is governed at least in part by one or more filter coefficients that are received as updated filter coefficients 195. The bank of noise predictive finite impulse response filters 140 may include a number of filters each tailored to filter a different noise pattern. In one particular embodiment of the present invention, the bank of noise predictive finite impulse response filters 140 includes eight digital filters each tailored to a respective noise pattern. Operation of one or more of the filters in the bank of noise predictive finite impulse response filters 140 is governed at least in part by filter coefficients received as updated filter coefficients 195. Based upon the disclosure provided herein, one of ordinary skill in the art will recognize a variety of numbers of filters that may be included in the bank of noise predictive finite impulse response filters 140 including, but not limited to, four, sixteen or thirty-two filters. Further, based upon the disclosure provided herein, one of ordinary skill in the art will recognize a other implementations of noise predictive equalizer circuit 120 that are governed by updated filter coefficients 195 in accordance with embodiments of the present invention.

In some cases, the bank of noise predictive finite impulse response filters 140 is in bypass mode. In such cases, updated filter coefficients 195 are used as the taps to digital finite impulse response filter 130. Where both digital finite impulse response filter 130 and the bank of noise predictive finite impulse response filters 140 are operational, updated filter coefficients 195 are used as the taps to digital finite impulse response filter 130 and as the coefficients of the bank of noise predictive finite impulse response filters 140. In this document, it is assumed that the bank of noise predictive finite impulse response filters 140 is in bypass mode when optimization or calibration of updated filter coefficients is ongoing. It should be noted that the same approach may be used where both digital finite impulse response filter 130 and the bank of noise predictive finite impulse response filters 140 are operational.

Y samples 145 are provided by noise predictive equalizer circuit 120 to a optimized data detector circuit 150. Optimized data detector circuit 150 may include at its core a Viterbi algorithm detector circuit as are known in the art. Other embodiments may include other detector types known in the art. For example, the approaches discussed herein may be applied where a maximum a posteriori detector as are known in the art is utilized as the core detector circuit. In operation, when an optimize signal 175 is asserted such that standard operation is selected, optimized data detector circuit 150 operates as a standard data detector providing a detected output 190 and leaving updated filter coefficients 195 unchanged. Thus, for example, where the core detector is a Viterbi algorithm detector circuit, a standard Viterbi algorithm detection process is applied to Y samples 145 to yield detected output 190, and updated filter coefficients 195 are not modified.

In this situation, detected output 190 is provided to a low density parity check decoder circuit 160 as are known in the art. Low density parity check decoder circuit 160 applies a decoding algorithm to detected output 190 to yield both hard decision data and log likelihood ratio (i.e., soft decision data) 165 as is known in the art. Of note, other types of decoder circuits may be used in place of low density parity check decoder circuit 160.

In contrast, when optimize signal 175 is asserted such that an optimization or calibration process is selected, optimized data detector circuit 150 uses a known data input (represented as an expected most likely path input 185) corresponding to Y samples 145 to determine updated filter coefficients 195 that will increase the likelihood that the operation of noise predictive equalizer circuit 120 will yield an output (i.e., Y samples 145) that result in optimal operation of the core detector circuit in distance optimized data detector circuit 150. The determined updated filter coefficients 195 are provided to noise predictive equalizer circuit 120. The optimization process performed by optimized data detector circuit 150 is controlled in part by an update gain value 180. Update gain value 180 may be a fixed value or a programmable value depending upon the particular implementation. Where update gain value 180 is a programmable value, a writable register (not shown) may be implemented to store the programmed value. Based upon the disclosure provided herein, one of ordinary skill in the art may recognize a variety of approaches for implementing a programmed value that may be used in relation to embodiments of the present invention.

Figure 1B:
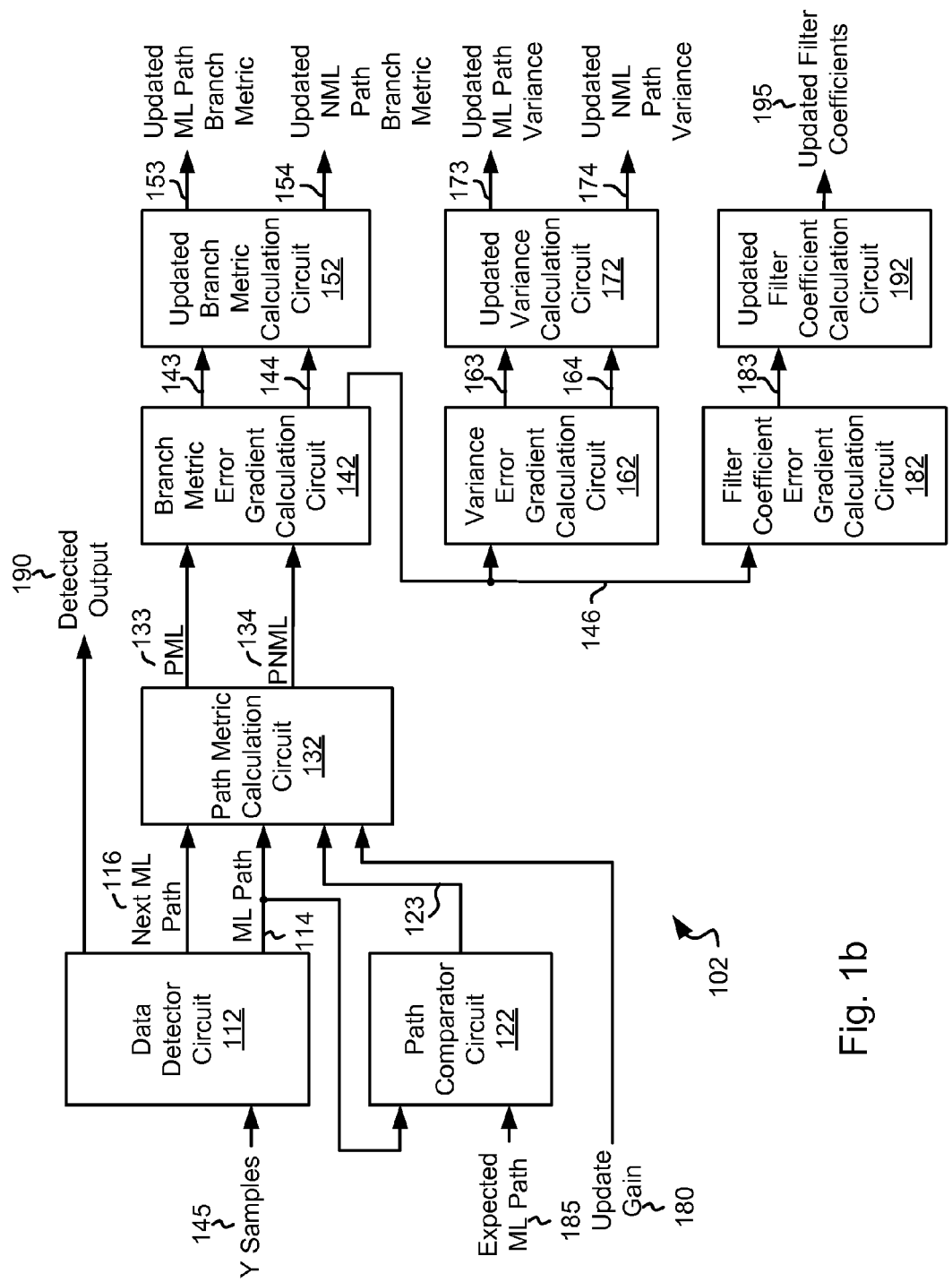
FIG. 1b depicts one implementation of the optimized data detector circuit of FIG. 1a that may be used in accordance with one or more embodiments of the present invention.

Turning to FIG. 1b, an optimized data detector circuit 102 is show in accordance with some embodiments of the present invention. Optimized data detector circuit 102 is one implementation of optimized data detector circuit 110 of FIG. 1a that may be used in relation to one or more embodiments. Optimized data detector circuit 102 includes a core data detector circuit 112. Data detector circuit may be any path based data detector circuit known in the art. In some embodiments of the present invention, data detector circuit 112 is a Viterbi algorithm data detector circuit that operates to determine the most likely path 114 (i.e., the most likely series of data transitions), and the next most likely path 116 (i.e., the next most likely series of data transitions). The difference between most likely path 114 and next most likely path 116 is used to optimize updated filter coefficients 195. In addition, data detector circuit 112 provides detected output 190.

Figure 2A:
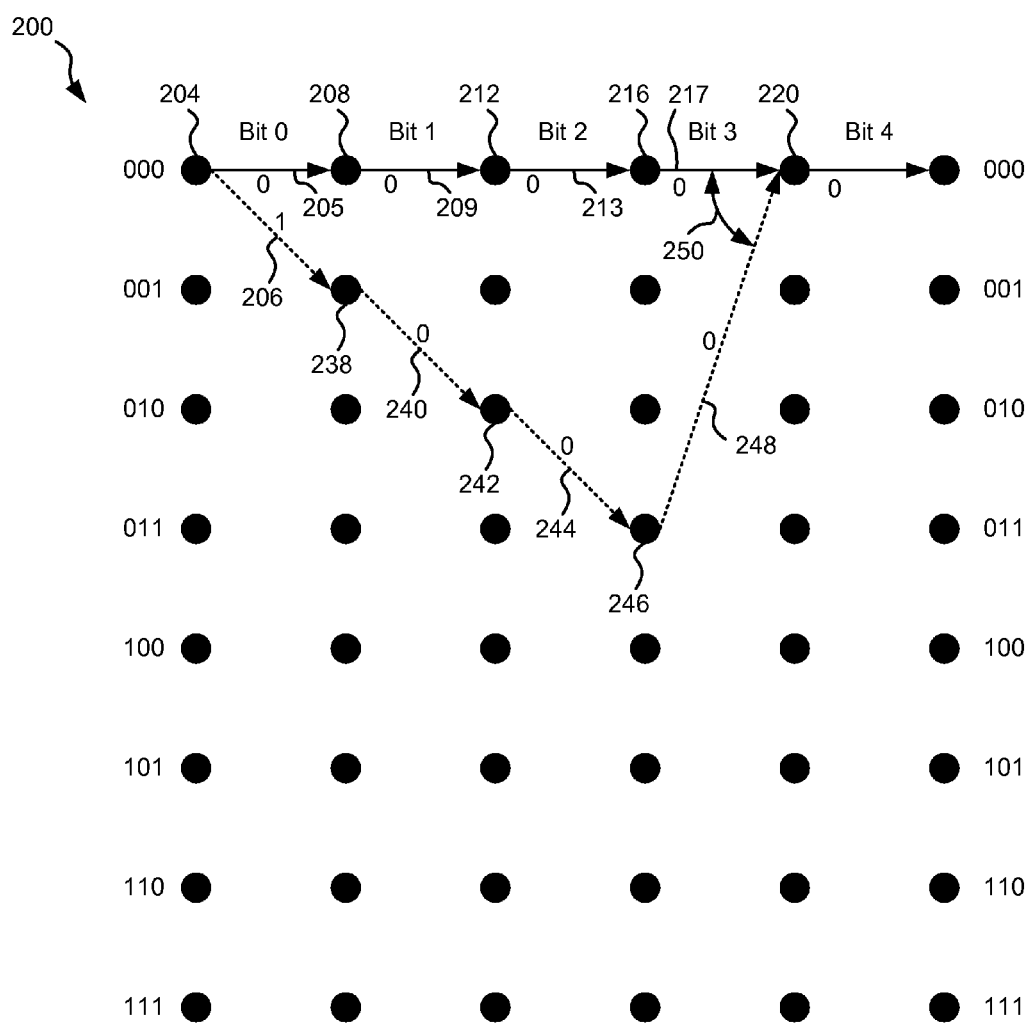
FIG. 2a graphically depicts an example of a most likely and a next most likely path metric from a data detector circuit.

FIG. 2a graphically depicts an example 200 of a most likely and a next most likely path metric from data detector circuit 102. The most likely path is shown by solid arrow lines from a beginning node 204 to an ending node 220, and the next most likely path is shown by dashed arrow lines from beginning node 204 to ending node 220. As shown, beginning node 204 (corresponding to a '000' pattern) is followed by a most likely transition '0' represented as a path 205 to a node 208, and a less likely transition '1' represented as a path 206 to a node 238. The most likely path further includes a path 209 represents another transition '0' from node 208 to a node 212, a path 213 representing another transition '0' from node 212 to a node 216, and a path 217 representing another transition '0' from node 216 to a node 220. The next most likely path further includes a path 240 representing a transition '0' from node 238 to a node 242, a path 244 representing another transition '0' from node 242 to a node 246, and a path 248 representing another transition '0' from node 246 to node 220. Of note, the difference between the most likely path and the next most likely path occurs at bit position zero (i.e., Bit 0) where alternative selections are made. The difference between the next most likely path and the most likely path may be characterized by an angle (delta) 250 at the convergence of the two paths. Angle (delta) 250 may be used to characterize an error magnitude, and thereby judge the likelihood that data detector circuit 112 made the appropriate decision. Further details of how a Viterbi algorithm operates may be found in J. Hagenauer and P. Hoeher, "A Viterbi algorithm with soft-decision outputs and its applications," in Proc. IEEE GLOBECOM, pp. 47.11-47.17, Dallas, Tex., November 1989. The entirety of the aforementioned reference is incorporated herein by reference for all purposes. The following equation (2) represents the value of delta (angle 250):

$$\Delta = \sum_{i=0}^{D} \frac{(y_i - \bar{y}_{i,j})^2}{2\sigma_{i,j}^2} - \sum_{i=0}^{D} \frac{(y_i - \bar{y}_{i,k})^2}{2\sigma_{i,k}^2}, \quad (2)$$

where D is the path depth (e.g., the path depth in example 200 is four-path 205, path 209, path 213 and path 217; or path 206, path 240, path 244 and path 248). $y_i$ corresponds to one of Y samples 145 at a time index i. $\bar{y}_{i,j}$ is the desired branch metric value for branch metric at time index corresponding to the next most likely path (sequence). $\bar{y}_{i,k}$ is the desired branch metric value for branch metric at time index corresponding to the most likely path. For example, in example 200 at time index i=0, $\bar{y}_{0,j}$ is the branch metric value for path 206 from node 204 to node 238 (i.e., the path from '000' to '001'), and $\bar{y}_{0,k}$ the branch metric value for path 205 from node 204 to node 208 (i.e., the path from '000' to '000'). Since the values of branch metric will not be changed while time index is changing, the time index of $\bar{y}_{i,j}$ and $\bar{y}_{i,k}$ can be dropped to yield $\bar{y}_j$ and $\bar{y}_k$, respectively. Similarly, for the variance term in equation (2), $\sigma_{i,j}$ and $\sigma_{i,k}$ can be simplified to $\sigma_j$ and $\sigma_k$, respectively. Therefore, equation 2 can be re-written as set forth in equation (3):

$$\Delta = \sum_{i=0}^{D} \frac{(y_i - \bar{y}_{i,j})^2}{2\sigma_{i,j}^2} - \sum_{i=0}^{D} \frac{(y_i - \bar{y}_{i,k})^2}{2\sigma_{i,k}^2} = P_{NML} - P_{ML}, \quad (3)$$

where j and k are indexes of the respective branches extending from 0 to M−1 with M representing the number of states in data detector circuit 112. In example 200, the number of states is eight ('000', '001', '010', '011', '100', '101', '110', and '111'). Based on the disclosure provided herein, one of ordinary skill in the art will recognize a variety of numbers of states and most likely and next most likely paths that may be used and/or occur in relation to different embodiments of the present invention.

$P_{NML}$ and $P_{ML}$ represent the next most likely path and the most likely paths, respectively. As the path metrics value of the most likely path is by definition smaller than the path metrics value for the next most likely path, the value of delta (angle 250) is always positive. To simplify circuitry by avoiding division, the following variance values are defined:

$$v_j = \frac{1}{2\sigma_j^2} \text{ and } v_k = \frac{1}{2\sigma_k^2}.$$

Using these simplifications, equation (3) can be rewritten as equation (4) below:

$$\Delta = \sum_{i=0}^{D} v_j(y_i - \bar{y}_{i,j})^2 - \sum_{i=0}^{D} v_k(y_i - \bar{y}_{i,k})^2 = P_{NML} - P_{ML}. \quad (4)$$

Returning to FIG. 1b, when in an optimization or calibration mode (as indicated by optimize signal 175), a path comparator circuit 122 determines whether the most likely path 114 as determined by data detector circuit 112 is correct by comparing it with expected most likely path 185. Expected most likely path 185 may be a known input corresponding to a known data input used to derive Y samples 145. Alternatively, expected most likely path 185 may be a stored value obtained during successful processing of a previously unknown data set by optimized data detector circuit 150 and low density parity check decoder circuit 160 (i.e., converged processing where all data checks indicated that the received data set was properly decoded). In such a case, the previously decoded data set is decoded again for calibration purposes. Based upon the disclosure provided herein, one of ordinary skill in the art will recognize a variety of sources of expected most likely path 185. The aforementioned delta (angle 250) is calculated by a path metric calculation circuit 132. In some cases, delta is calculated in accordance with equation (4) above.

There are one of two possibilities indicated by a comparator output 123. The first case is where most likely path 114 does not match expected most likely path 185 (i.e., data detector circuit 112 guessed incorrectly, and presumably next most likely path 116 is correct), and the second case is where most likely path 114 matches expected most likely path 185 (i.e., data detector circuit 112 guessed correctly).

In the first case, it is desired to reduce the delta value (i.e., angle 250) which at some point (i.e., where the delta value becomes negative) results in next most likely path 116 being selected as the most likely path and most likely path 114 being selected as the next most likely path. In this case, a path metric calculation circuit 122 modifies the path metrics ($P_{ML}$ and $P_{NML}$) associated with most likely path 114 and next most likely path 116 in accordance with the following equations (5):

$$P_{ML} = P_{ML} + \eta \times \Delta, \text{ and} \quad (5a)$$

$$P_{NML} = P_{NML} - \eta \times \Delta, \quad (5b)$$

where $\eta$ is provided as update gain value 180, and $\Delta$ is calculated by path metric calculation circuit 132 in accordance with equation (4) above. The aforementioned path metrics are provided as a PML output 133 and a PNML output 134, respectively. Of note, the first case operates the same regardless of whether a Viterbi algorithm data detector circuit of a maximum a posteriori data detector circuit is used as data detector circuit 112.

Figure 2B:
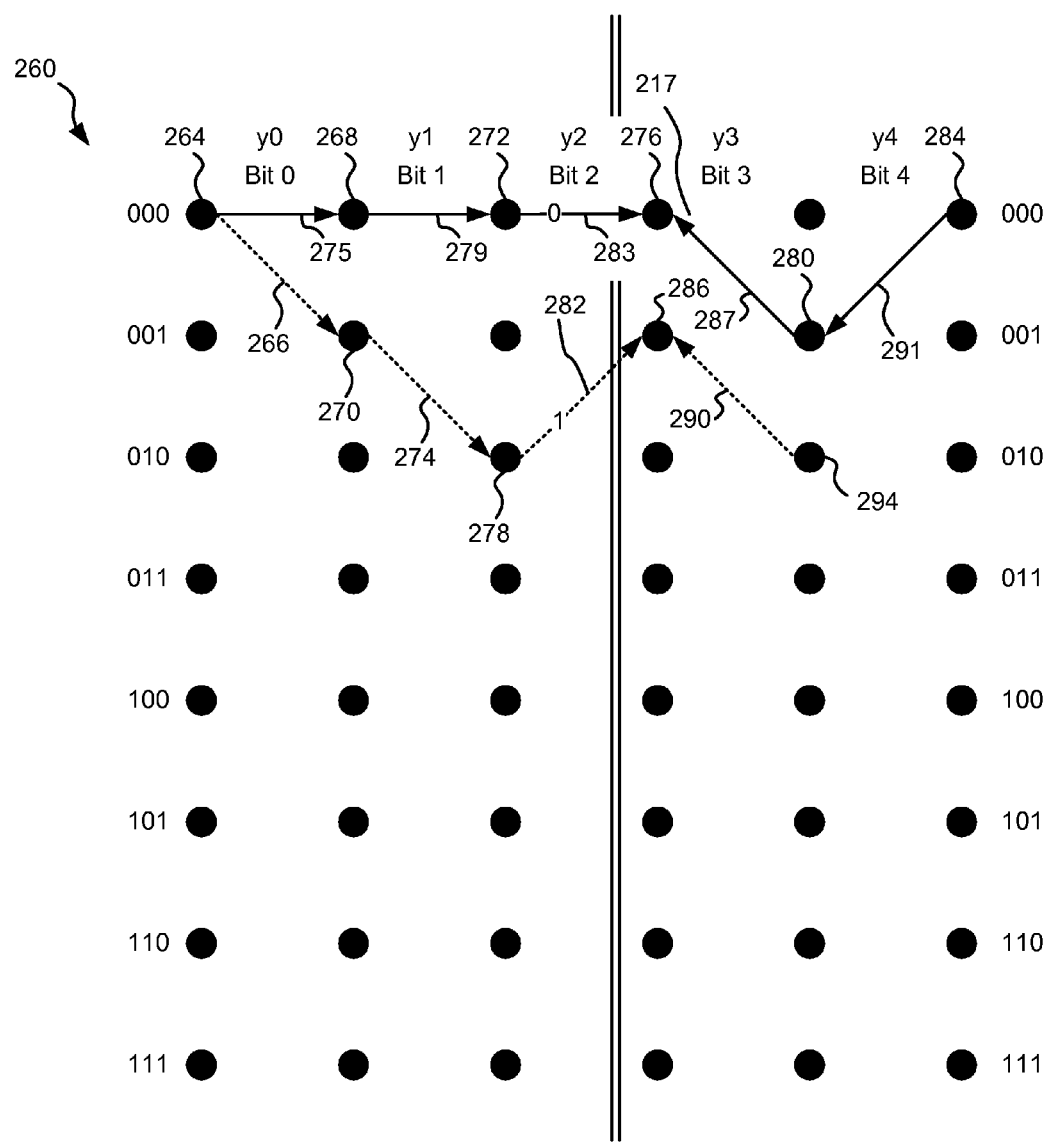
FIG. 2b graphically depicts an example of a most likely and a next most likely path metric from a data detector circuit where a maximum a posteriori detector circuit is used as the core detector circuit.

In the second case, it is desired to increase the delta value (i.e., angle 250) to further reduce the likelihood that data detector circuit 112 made an error in selecting most likely path 114 over next most likely path 116. In this case, path metric calculation circuit 122 modifies the path metrics ($P_{ML}$ and $P_{NML}$) associated with most likely path 114 and next most likely path 116 in accordance with the following equations (6):

$$P_{ML} = P_{ML} - \eta \times \Delta, \text{ and} \quad (6a)$$

$$P_{NML} = P_{NML} + \eta \times \Delta, \quad (6b)$$

where $\eta$ is provided as update gain value 180, and $\Delta$ is calculated by path metric calculation circuit 132 in accordance with equation (4) above. The aforementioned path metrics are provided as PML output 133 and PNML output 134, respectively. Of note, the second case described above applies where data detector circuit 112 is a Viterbi algorithm data detector circuit. In contrast, where data detector circuit 112 is a maximum a posteriori data detector circuit, equation (6a) and equation (6b) may be applied when a resulting log likelihood ratio output is lower than a programmable threshold value. Further, better operation may be achieved where the path depth (D) is the same as the default length of the maximum a posteriori detector circuit that is employed. FIG. 2b graphically depicts an example 260 of a most likely and a next most likely path metric from a data detector circuit where a maximum a posteriori detector circuit is used as the core detector circuit. The best path corresponding to a decision '0' is shown by solid arrow lines from a beginning node 264 to an ending node 284, and the best path corresponding to a decision '1' is shown by dashed arrow lines from beginning node 264 to ending node 294. As shown, beginning node 264 (corresponding to a '000' pattern) is followed by a transition '0' represented as a path 275 to a node 268, and a transition '1' represented as a path 266 to a node 270. The best path corresponding to a decision '0' further includes a path 279 represents another transition '0' from node 268 to a node 272, a path 283 representing another transition '0' from node 272 to a node 276, a path 287 representing a transition '1' from node 276 to a node 280, and a path 291 from node 280 to node 284. The best path corresponding to a decision '1' further includes a path 274 representing a transition '0' from node 270 to a node 278, a path 282 representing a transition '1' from node 278 to a node 286, and a path 290 representing another transition '0' from node 286 to a node 294.

Combining the first case and the second case described above, the equations for the path metrics may be described as in equations (7a and 7b) below:

$$P_{ML} = P_{ML} - \eta \times \Delta_e, \text{ and} \quad (7a)$$

$$P_{ML} = P_{ML} - \eta \times \Delta_e, \quad (7b)$$

Where $\Delta_e$ is described by the following equation (7c):

$$\Delta_e = \begin{cases} +\Delta & \text{for the first case} \\ -\Delta & \text{for the second case} \end{cases} \quad (7c)$$

PML output 133 and PNML output 134 are provided to a branch metric error gradient calculation circuit 142.

Error gradient calculation circuit 142 calculates an error value ($\epsilon$) in accordance with the following equation (8a):

$$\epsilon = \Delta_e^2 = \Delta^2 = (PSML \text{ Output} - PML \text{ Output})^2. \quad (8a)$$

PSML Output and PML Output are described by the following equations 8b and 8c:

$$PSML\ \text{Output} = \sum_{i=0}^{D} v_j(y_i - \overline{y}_j)^2, \text{ and} \quad (8b)$$

$$PML\ \text{Output} = \sum_{i=0}^{D} v_k(y_i - \overline{y}_k)^2. \quad (8c)$$

Accordingly, equation (8a) may be rewritten as equation (8d) below:

$$\varepsilon = \left(\sum_{i=0}^{D} v_j(y_i - \overline{y}_j)^2 - \sum_{i=0}^{D} v_k(y_i - \overline{y}_k)^2\right)^2 \quad (8c)$$

This error value ($\varepsilon$) is provided as an error output 146. Using this calculated error value, error gradient calculation circuit 142 calculates the following error gradient values for the detector branch metrics (equation (9a) and equation (9b)):

$$\frac{\partial \varepsilon}{\partial \overline{y}_j} = 2\Delta \times \frac{\partial \Delta}{\partial \overline{y}_j} = -4\Delta \times v_j \times (y_i - \overline{y}_j), \text{ and} \quad (9a)$$

$$\frac{\partial \varepsilon}{\partial \overline{y}_k} = 2\Delta \times \frac{\partial \Delta}{\partial \overline{y}_k} = -4\Delta \times v_k \times (y_i - \overline{y}_k). \quad (9b)$$

$$\frac{\partial \varepsilon}{\partial \overline{y}_j}$$

is provided as an output 143 from branch metric error gradient calculation circuit 142, and $$\frac{\partial \varepsilon}{\partial \overline{y}_k}$$

is provided as an output 144 from branch metric error gradient calculation circuit 142.

Output 143 and output 144 are provided to an updated branch metric calculation circuit 152 where they are used to calculate updated branch metrics. In particular, updated branch metric calculation circuit 152 yields the following updated branch metric 153 ($\overline{y}_k(n+1)$) for the most likely path, and updated branch metric 154 ($\overline{y}_j(n+1)$) from the next most likely path where the first case (i.e., most likely path 114 does not match expected most likely path 185) occurs:

$$\overline{y}_j(n+1) = \overline{y}_j(n) - \eta \frac{\partial \varepsilon}{\partial \overline{y}_j} = \overline{y}_j(n) + \eta \times 4\Delta \times v_j \times (y_i - \overline{y}_j), \quad (10)$$

and $$\overline{y}_k(n+1) = \overline{y}_k(n) - \eta \frac{\partial \varepsilon}{\partial \overline{y}_k} = \overline{y}_k(n) - \eta \times 4\Delta \times v_k \times (y_i - \overline{y}_k).$$

In the second case (i.e., most likely path 114 matches expected most likely path 185), updated branch metric calculation circuit 152 yields the following updated branch metric 153 ($\overline{y}_k(n+1)$) for the most likely path, and updated branch metric 154 ($\overline{y}_j(n+1)$) for the next most likely path:

$$\overline{y}_j(n+1) = \overline{y}_j(n) - \eta \frac{\partial \varepsilon}{\partial \overline{y}_j} = \overline{y}_j(n) - \eta \times 4\Delta \times v_j \times (y_i - \overline{y}_j), \quad (11)$$

and $$\overline{y}_k(n+1) = \overline{y}_k(n) - \eta \frac{\partial \varepsilon}{\partial \overline{y}_k} = \overline{y}_k(n) + \eta \times 4\Delta \times v_k \times (y_i - \overline{y}_k).$$

Error output 146 is provided to a variance error gradient calculation circuit 162. Variance error gradient calculation circuit 162 calculates the following error gradient values for the most likely path and the next most likely path:

$$\frac{\partial \varepsilon}{\partial v_j} = 2\Delta \times \frac{\partial \Delta}{\partial v_j} = -4\Delta \times (y_i - \overline{y}_j)^2, \text{ and} \quad (12a)$$

$$\frac{\partial \varepsilon}{\partial v_k} = 2\Delta \times \frac{\partial \Delta}{\partial v_k} = -4\Delta \times (y_i - \overline{y}_j)^2. \quad (12b)$$

$$\frac{\partial \varepsilon}{\partial v_j}$$

is provided as an output 163 from branch variance gradient calculation circuit 162, and $$\frac{\partial \varepsilon}{\partial v_k}$$

is provided as an output 164 from variance error gradient calculation circuit 162.

Output 163 and output 164 are provided to an updated variance calculation circuit 172 where they are used to calculate updated variance values. In particular, updated variance calculation circuit 172 yields the following updated variance 173 ($v_k(n+1)$) for the most likely path, and updated variance 174 ($v_j(n+1)$) for the next most likely path where the first case (i.e., most likely path 114 does not match expected most likely path 185) occurs:

$$v_j(n+1) = v_j(n) - \eta \frac{\partial \varepsilon}{\partial v_j} = v_j(n) - \eta \times 4\Delta \times (y_i - \overline{y}_j)^2, \text{ and} \quad (13)$$

$$v_k(n+1) = v_k(n) - \eta \frac{\partial \varepsilon}{\partial v_k} = v_k(n) + \eta \times 4\Delta \times (y_i - \overline{y}_k)^2.$$

In the second case (i.e., most likely path 114 matches expected most likely path 185), updated branch metric calculation circuit 152 yields the following updated branch metric 153 ($\overline{y}_k(n+1)$) for the most likely path, and updated branch metric 154 ($\overline{y}_j(n+1)$) from the next most likely path:

$$v_j(n+1) = v_j(n) - \eta \frac{\partial \varepsilon}{\partial v_j} = v_j(n) + \eta \times 4\Delta \times (y_i - \overline{y}_j)^2, \text{ and} \quad (14)$$

$$v_k(n+1) = v_k(n) - \eta \frac{\partial \varepsilon}{\partial v_k} = v_k(n) + \eta \times 4\Delta \times (y_i - \overline{y}_k)^2.$$

In addition, error output 146 is provided to a filter coefficient error gradient calculation circuit 182. Filter coefficient error gradient calculation circuit 182 calculates the following error gradient value:

$$\frac{\partial \varepsilon}{\partial w_l} = 2\Delta \times \frac{\partial \Delta}{\partial w_l} = 4\Delta \times ((y_i - \bar{y}_j) \times x_{D-1} \times v_j - (y_i - \bar{y}_k) \times x_{D-1} \times v_k). \quad (15)$$

$$\frac{\partial \varepsilon}{\partial w_l}$$

is provided as an output 183 from filter coefficient error gradient calculation circuit 182.

Output 183 is provided to an updated filter coefficient calculation circuit 192 where they are used to calculate updated filter coefficient values. In particular, updated filter coefficient calculation circuit 192 yields the following updated filter coefficient 195 ($w_l(n+1)$) where the first case (i.e., most likely path 114 does not match expected most likely path 185) occurs:

$$w_l(n+1) = w_l(n) - \eta \frac{\partial \varepsilon}{\partial v_l} = \quad (16)$$
$$w_l(n) - \eta \times 4\Delta \times ((y_i - \bar{y}_j) \times x_{D-1} \times v_j - (y_i - \bar{y}_k) \times x_{D-1} \times v_k).$$

In the second case (i.e., most likely path 114 matches expected most likely path 185), updated filter coefficient calculation circuit 192 yields the following updated filter coefficient 195 ($w_l(n+1)$):

$$w_l(n+1) = w_l(n) - \eta \frac{\partial \varepsilon}{\partial v_l} = \quad (17)$$
$$w_l(n) + \eta \times 4\Delta \times ((y_i - \bar{y}_j) \times x_{D-1} \times v_j - (y_i - \bar{y}_k) \times x_{D-1} \times v_k).$$

As previously discussed, updated filter coefficients 195 are provided to noise predictive equalizer circuit 120 where they are used to tune one or more filters included in noise predictive equalizer circuit 120.

In some cases, one or more simplifications can be made to the aforementioned equations to yield a less complex implementation. For example, update gain value 180 may be provided as η×4 to eliminate one multiplication. Alternatively, the 4Δ term may be simply removed or approximated where update gain value 180 may be provided as η×4Δ. Other simplifications may also be made such as, for example, only updated branch metrics (i.e., applying updated branch metric 153 and updated branch metric 154, but not calculating or applying updated variance 173 and updated variance 174 as such criterion can be self adapted using least mean square correction that may be employed in other parts of the circuit. Based upon the disclosure provided herein, one of ordinary skill in the art will recognize a variety of other simplifications that may be made in accordance with embodiments of the present invention.

In some cases, optimize signal 175 is occasionally asserted resulting in an occasional calibration of data processing circuit 100. Such occasional assertion of optimize signal 175 to cause calibration of data processing circuit 100 may be triggered when a bit error rate of data processing circuit 100 exceeds a defined threshold. In other cases, optimize signal 175 is automatically asserted to trigger a calibration process whenever a delta value (equation (4)) calculated by path metric calculation circuit 132 indicates an increased probability of an error. Under normal operating conditions, a large delta indicates a relatively low probability of a misidentified path when compared with a small delta. Accordingly, optimize signal 175 may be asserted to cause calculation of updated filter coefficients 195 whenever the delta value calculated by path metric calculation circuit 132 is below a programmable threshold value. In some cases, a noise averaging function may be applied such that optimize signal 175 is asserted to cause calculation of updated filter coefficients 195 whenever a sum of a defined number of consecutive delta values calculated by path metric calculation circuit 132 is below a programmable threshold value. Based upon the disclosure provided herein, one of ordinary skill in the art will appreciate a variety of conditions that may be used to trigger optimization or calibration resulting in the calculation of updated filter coefficients 195.

The preceding circuit is described base on an assumption that the data set being processed is known beforehand. Such knowledge allows for comparison of the most likely path with the next most likely path to determine whether the first case processing or the second case processing is to be performed. However, some embodiments of the present invention provide for processing where the data set being processed is not known beforehand. For example, some embodiments of the present invention include a slicer circuit or utilize an early output from detector circuit 112 (i.e., either a Viterbi or maximum a posteriori detector circuit) to determine whether a most likely path is correct or not. By utilizing a low-latency detector, it is possible to update the equations set forth above at decision-direction mode which the transmitted data is unknown.

In some embodiments of the present invention the occurrence of an error event is considered in the equations. In particular, where an error event occurs the hamming distance (τ) associated with the error event can be incorporated into update gain value 180 in accordance with the following equation:

$$\eta_e = \eta \times \tau.$$

This scaled gain value is then used in calculating the updated branch metrics described above in relation to equation (10) and equation (11) to yield the following modified equations:

$$\bar{y}_j(n+1) = \bar{y}_j(n) + \text{sign}(\Delta_e) \times \eta \times \tau \times v_j \times (y_i - \bar{y}_j), \text{ and}$$

$$\bar{y}_k(n+1) = \bar{y}_k(n) - \text{sign}(\Delta_e) \times \eta \times \tau \times v_k \times (y_i - \bar{y}_k). \quad (18)$$

The scaled gain value is also used in calculating the updated variance described above in relation to equation (13) and equation (14) to yield the following modified equations:

$$v_j(n+1) = v_j(n) - \text{sign}(\Delta_e) \times \eta \times \tau \times (y_i - \bar{y}_j)^2, \text{ and}$$

$$v_k(n+1) = v_k(n) - \text{sign}(\Delta_e) \times \eta \times \tau \times (y_i - \bar{y}_k)^2. \quad (19)$$

In addition, the scaled gain value is used in calculating the updated filter coefficients described above in relation to equation (16) and equation (17) to yield the following modified equation:

$$w_l(n+1) = w_l(n) - \text{sign}(\Delta_e) \times \eta \times \tau \times ((y_i - \bar{y}_j) \times x_{D-1} \times v_j - (y_i - \bar{y}_k) \times x_{D-1} \times v_k). \quad (20)$$

In the aforementioned equations, sign($\Delta_e$) corresponds to the sign of $\Delta_e$ described above in equation (7c).

Figure 3:
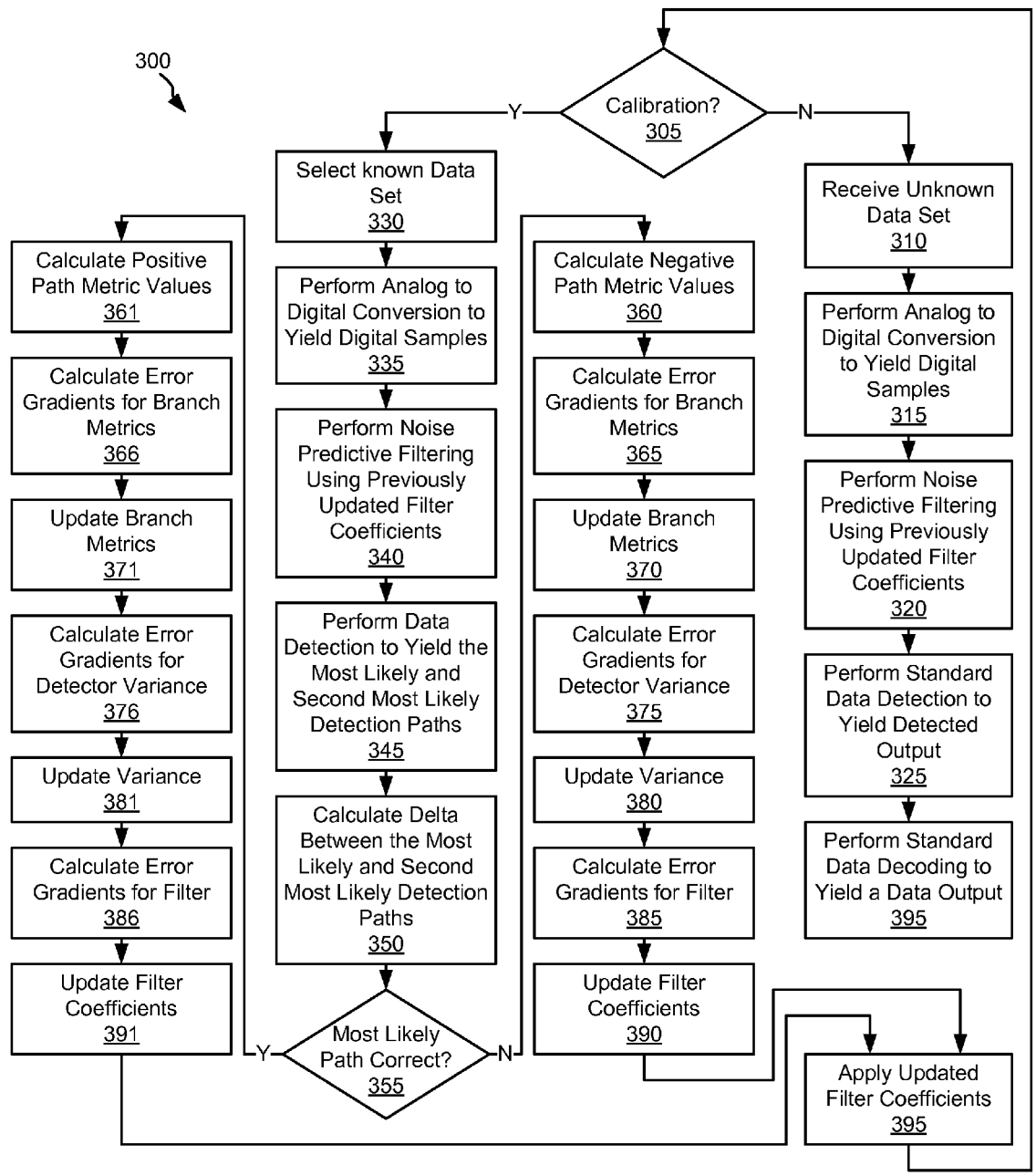
FIG. 3 is a flow diagram showing a method in accordance with various embodiments of the present invention for performing optimized data detection.

Turning to FIG. 3, a flow diagram 300 shows a method in accordance with various embodiments of the present invention for performing optimized data detection. Following flow diagram 300, it is determined whether calibration is desired (block 305). Determining whether calibration is desired may be done, for example, based upon a programmable user input. Alternatively, or in addition, determining whether calibration is desired may be done automatically based upon a detected bit error rate increase or a change in an error indication such as, for example, based upon a decrease in an angular difference between competing paths from a detector circuit. Based upon the disclosure provided herein, one of ordinary skill in the art will recognize a variety of ways in which a calibration determination may be made.

Where no calibration is desired (block 305), an unknown data set is received (block 310). This data set may be, for example, a data set derived from sensing magnetic information stored on a hard disk drive. As another example, the data set may be data received via a wireless communication medium. Based upon the disclosure provided herein, one of ordinary skill in the art will recognize a variety of sources for the unknown data set. The reason the data set is referred to as "unknown" is to indicate that the contents of the data set is unknown until it is processed. The received data set is converted from an analog input signal to a series of corresponding digital samples by an analog to digital converter circuit (block 315). Noise predictive filtering is performed on the series of digital samples using previously updated filter coefficients (block 320). Standard data detection is then performed on the noise filtered data to yield a detected output (block 325). The data detection process may be, but is not limited to, a Viterbi algorithm detection process or a maximum a posteriori detection algorithm. Based upon the disclosure provided herein, one of ordinary skill in the art will recognize other types of detection processes that may be used in relation to different embodiments of the present inventions. Standard data decoding is then performed on the detected output to yield a data output (block 395). In some cases, the data decoding process is a low density parity check decoding process. Based upon the disclosure provided herein, one of ordinary skill in the art will recognize other data decoding processes that may be used in relation to different embodiments of the present invention.

Alternatively, where no calibration is desired (block 305) a known data set is selected (block 330). Selecting the known data set may include, for example, reading data from a location that has a known data set that can be used for calibration. Alternatively, selecting the known data set may include processing an unknown data set and once the processing successfully completes the decoded data set is known and can be used for calibration processing. As yet another example, an unknown data set may be processed and early decisions from the data detection may be used as the known data set. Based upon the disclosure provided herein, one of ordinary skill in the art will recognize a variety of sources from which a known data set is derived. The known data set is converted from an analog input signal to a series of corresponding digital samples by an analog to digital converter circuit (block 335). Of note, where the known data set is a digital data set, the analog to digital conversion process is not necessary. Noise predictive filtering is performed on the series of digital samples using previously updated filter coefficients (block 340).

A standard data detection is performed on the noise filtered data set that yields at each step a most likely path and a next most likely path (block 345). The data detection may be done using, for example, a Viterbi algorithm detector circuit or a maximum a posteriori detector circuit. An error difference between the most likely data path and next most likely data path is calculated (block 350). In the case of a Viterbi algorithm detector circuit, the error difference is a delta value calculated in accordance with the following equation:

$$\Delta = \sum_{i=0}^{D} \frac{(y_i - \bar{y}_{i,j})^2}{2\sigma_{i,j}^2} - \sum_{i=0}^{D} \frac{(y_i - \bar{y}_{i,k})^2}{2\sigma_{i,k}^2}, \quad (2)$$

where D is the path depth, $y_i$ corresponds to one of filtered samples at a time index i, $\bar{y}_{i,j}$ is the desired branch metric value for branch metric at time index corresponding to the next most likely path (sequence), $\bar{y}_{i,k}$ is the desired branch metric value for branch metric at time index corresponding to the most likely path, and $\sigma_{i,j}$ is the variance corresponding to the next most likely path, and $\sigma_{i,k}$ is the variance corresponding to the most likely path.

The most likely path is compared against an expected most likely path to determine whether the most likely path is correct (block 355). The expected most likely path is available because the data set being processed is known, and thus the correct most likely path is known. In the first case where the most likely path does not match the expected most likely path (block 355), it is desired to reduce the delta value which at some point (i.e., where the delta value becomes negative) results in the next most likely path being selected as the most likely path, and the most likely path being selected as the next most likely path. In this case, path metric calculations are done in accordance with the following equations (block 360):

$$P_{ML} = P_{ML} + \eta \times \Delta, \text{ and}$$

$$P_{NML} = P_{NML} - \eta \times \Delta,$$

where $\eta$ is a programmable or fixed gain value, and $\Delta$ is calculated by path metric calculation done in the preceding process of block 350.

Error branch gradients for the branch metrics are calculated (block 365). This includes calculating an error value in accordance with the following equation:

$$\varepsilon = \left( \sum_{i=0}^{D} v_j (y_i - \bar{y}_j)^2 - \sum_{i=0}^{D} v_k (y_i - \bar{y}_k)^2 \right)^2.$$

Using this calculated error value, error gradient values for the detector branch metrics are calculated in accordance with the following equations:

$$\frac{\partial \varepsilon}{\partial \bar{y}_j} = 2\Delta \times \frac{\partial \Delta}{\partial \bar{y}_j} = -4\Delta \times v_j \times (y_i - \bar{y}_j), \text{ and}$$

$$\frac{\partial \varepsilon}{\partial \bar{y}_k} = 2\Delta \times \frac{\partial \Delta}{\partial \bar{y}_k} = -4\Delta \times v_k \times (y_i - \bar{y}_k).$$

Using the aforementioned gradients, updated branch metrics are calculated (block 370). The updated branch metrics are calculated in accordance with the following equations:

$$\bar{y}_j(n+1) = \bar{y}_j(n) - \eta \frac{\partial \varepsilon}{\partial \bar{y}_j} = \bar{y}_j(n) + \eta \times 4\Delta \times v_j \times (y_i - \bar{y}_j), \text{ and}$$

-continued $$\overline{y}_k(n+1) = \overline{y}_k(n) - \eta \frac{\partial \varepsilon}{\partial \overline{y}_k} = \overline{y}_k(n) - \eta \times 4\Delta \times v_k \times (y_i - \overline{y}_k).$$

Error gradients for the detector variance are calculated (block 375). The error gradients for the most likely path and the next most likely path may be calculated in accordance with the following equations:

$$\frac{\partial \varepsilon}{\partial v_j} = 2\Delta \times \frac{\partial \Delta}{\partial v_j} = -4\Delta \times (y_i - \overline{y}_j)^2, \text{ and}$$

$$\frac{\partial \varepsilon}{\partial v_k} = 2\Delta \times \frac{\partial \Delta}{\partial v_k} = -4\Delta \times (y_i - \overline{y}_j)^2.$$

Using the aforementioned gradients, updated variance values are calculated (block 380). In particular, an updated variance ($v_k(n+1)$) for the most likely path and the updated variance updated branch metric ($v_j(n+1)$) are calculated in accordance with the following equations:

$$v_j(n+1) = v_j(n) - \eta \frac{\partial \varepsilon}{\partial v_j} = v_j(n) - \eta \times 4\Delta \times (y_i - \overline{y}_j)^2, \text{ and}$$

$$v_k(n+1) = v_k(n) - \eta \frac{\partial \varepsilon}{\partial v_k} = v_k(n) + \eta \times 4\Delta \times (y_i - \overline{y}_k)^2.$$

Filter coefficient error gradient calculations are performed in accordance with the following equation (block 385):

$$\frac{\partial \varepsilon}{\partial w_l} = 2\Delta \times \frac{\partial \Delta}{\partial w_l} = 4\Delta \times ((y_i - \overline{y}_j) \times x_{D-1} \times v_j - (y_i - \overline{y}_k) \times x_{D-1} \times v_k).$$

Using the aforementioned gradient, updated filter coefficients are calculated (block 390). In particular, an updated filter coefficient 195 ($w_l(n+1)$) is calculated in accordance with the following equation:

$$w_l(n+1) = w_l(n) - \eta \frac{\partial \varepsilon}{\partial v_l} =$$
$$w_l(n) - \eta \times 4\Delta \times ((y_i - \overline{y}_j) \times x_{D-1} \times v_j - (y_i - \overline{y}_k) \times x_{D-1} \times v_k).$$

The updated coefficients are applied for use in the noise predictive filtering process (block 340) for subsequent data processing (block 395).

Alternatively, in a second case where the most likely path matches the expected most likely path (block 355), it is desired to increase the delta value to further reduce the likelihood that the data detector circuit made an error in selecting the most likely path over the next most likely path. In this case, path metric calculations are done in accordance with the following equations (block 361):

$$P_{ML} = P_{ML} - \eta \times \Delta, \text{ and}$$

$$P_{NML} = P_{NML} + \eta \times \Delta,$$

where η is provided as update gain value 180, and Δ is calculated by path metric calculation done in the preceding process of block 350.

Error branch gradients for the branch metrics are calculated (block 366). This includes calculating an error value in accordance with the following equation:

$$\varepsilon = \left( \sum_{i=0}^{D} v_j (y_i - \overline{y}_j)^2 - \sum_{i=0}^{D} v_k (y_i - \overline{y}_k)^2 \right)^2.$$

Using this calculated error value, error gradient values for the detector branch metrics are calculated in accordance with the following equations:

$$\frac{\partial \varepsilon}{\partial \overline{y}_j} = 2\Delta \times \frac{\partial \Delta}{\partial \overline{y}_j} = -4\Delta \times v_j \times (y_i - \overline{y}_j), \text{ and}$$

$$\frac{\partial \varepsilon}{\partial \overline{y}_k} = 2\Delta \times \frac{\partial \Delta}{\partial \overline{y}_k} = -4\Delta \times v_k \times (y_i - \overline{y}_k).$$

Using the aforementioned gradients, updated branch metrics are calculated (block 371). The updated branch metrics are calculated in accordance with the following equations:

$$\overline{y}_j(n+1) = \overline{y}_j(n) - \eta \frac{\partial \varepsilon}{\partial \overline{y}_j} = \overline{y}_j(n) - \eta \times 4\Delta \times v_j \times (y_i - \overline{y}_j), \text{ and}$$

$$\overline{y}_k(n+1) = \overline{y}_k(n) - \eta \frac{\partial \varepsilon}{\partial \overline{y}_k} = \overline{y}_k(n) + \eta \times 4\Delta \times v_k \times (y_i - \overline{y}_k).$$

Error gradients for the detector variance are calculated (block 376). The error gradients for the most likely path and the next most likely path may be calculated in accordance with the following equations:

$$\frac{\partial \varepsilon}{\partial v_j} = 2\Delta \times \frac{\partial \Delta}{\partial v_j} = -4\Delta \times (y_i - \overline{y}_j)^2, \text{ and}$$

$$\frac{\partial \varepsilon}{\partial v_k} = 2\Delta \times \frac{\partial \Delta}{\partial v_k} = -4\Delta \times (y_i - \overline{y}_j)^2.$$

Using the aforementioned gradients, updated variance values are calculated (block 381). In particular, an updated variance ($v_k(n+1)$) for the most likely path and the updated variance updated branch metric ($v_j(n+1)$) are calculated in accordance with the following equations:

$$v_j(n+1) = v_j(n) - \eta \frac{\partial \varepsilon}{\partial v_j} = v_j(n) + \eta \times 4\Delta \times (y_i - \overline{y}_j)^2, \text{ and}$$

$$v_k(n+1) = v_k(n) - \eta \frac{\partial \varepsilon}{\partial v_k} = v_k(n) + \eta \times 4\Delta \times (y_i - \overline{y}_k)^2.$$

Filter coefficient error gradient calculations are performed in accordance with the following equation (block 386):

$$\frac{\partial \varepsilon}{\partial w_l} = 2\Delta \times \frac{\partial \Delta}{\partial w_l} = 4\Delta \times ((y_i - \overline{y}_j) \times x_{D-1} \times v_j - (y_i - \overline{y}_k) \times x_{D-1} \times v_k).$$

Using the aforementioned gradient, updated filter coefficients are calculated (block 391). In particular, an updated filter coefficient 195 ($w_l(n+1)$) is calculated in accordance with the following equation:

$$w_l(n+1) = w_l(n) - \eta \frac{\partial \varepsilon}{\partial v_l} =$$

$$w_l(n) + \eta \times 4\Delta \times ((y_i - \bar{y}_j) \times x_{D-1} \times v_j - (y_i - \bar{y}_k) \times x_{D-1} \times v_k).$$

The updated coefficients are applied for use in the noise predictive filtering process (block 340) for subsequent data processing (block 395).

Figure 4:
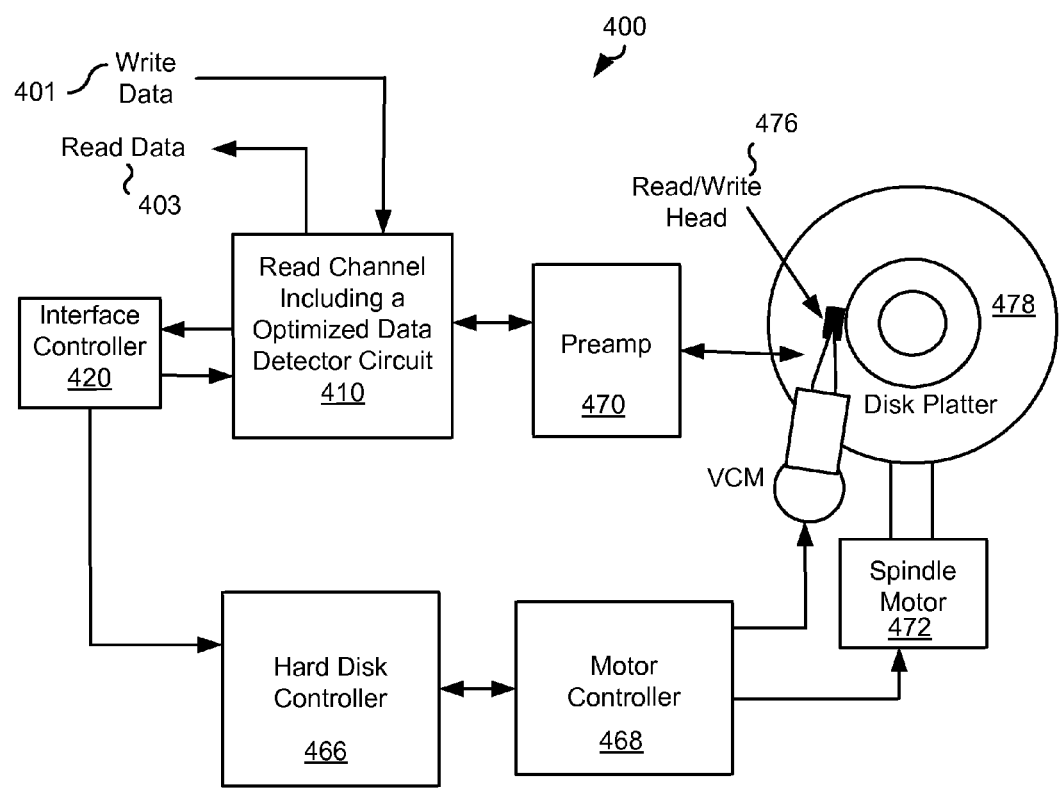
FIG. 4 shows a storage system with an optimized data detector circuit in accordance with various embodiments of the present invention.

Turning to FIG. 4, a storage system 400 including a read channel circuit 410 with an optimized data detector circuit in accordance with various embodiments of the present invention. Storage system 400 may be, for example, a hard disk drive. Storage system 400 also includes a preamplifier 470, an interface controller 420, a hard disk controller 466, a motor controller 468, a spindle motor 472, a disk platter 478, and a read/write head 476. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with either a longitudinal or a perpendicular recording scheme.

In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel 410 via preamplifier 470. Preamplifier 470 is operable to amplify the minute analog signals accessed from disk platter 478. In turn, read channel circuit 410 decodes and digitizes the received analog signal to recreate the information originally written to disk platter 478. This data is provided as read data 403 to a receiving circuit. As part of processing the received information, read channel circuit 410 performs an optimized data detection process using an optimized data detector circuit. Such an optimized data detector circuit may be implemented similar to that described above in relation to FIG. 1a and FIG. 1b, and/or may operate similar to the method discussed above in relation to FIG. 3. A write operation is substantially the opposite of the preceding read operation with write data 301 being provided to read channel circuit 410. This data is then encoded and written to disk platter 378.

It should be noted that storage system 400 may be integrated into a larger storage system such as, for example, a RAID (redundant array of inexpensive disks or redundant array of independent disks) based storage system. It should also be noted that various functions or blocks of storage system 400 may be implemented in either software or firmware, while other functions or blocks are implemented in hardware.

Figure 5:
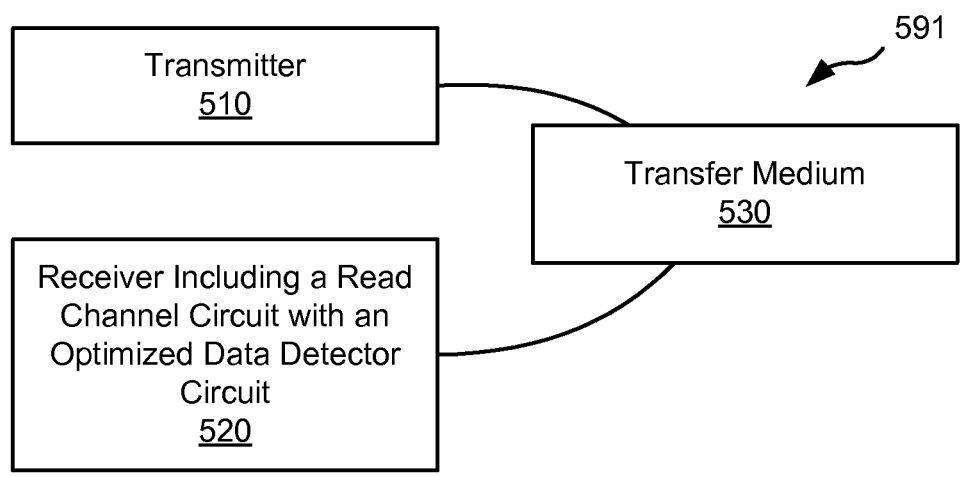
FIG. 5 depicts a communication system including a receiver having an optimized data detector circuit in accordance with other embodiments of the present invention.

Turning to FIG. 5, a communication system 500 including a receiver 520 with an optimized data detector circuit is shown in accordance with different embodiments of the present invention. Communication system 500 includes a transmitter 510 that is operable to transmit encoded information via a transfer medium 530 as is known in the art. The encoded data is received from transfer medium 530 by receiver 520. Receiver 520 incorporates an optimized data detector circuit. Such an optimized data detector circuit may be implemented similar to that described above in relation to FIGS. 1a-1b, and/or may operate similar to the method discussed above in relation to FIG. 3.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing data processing and/or updating filter coefficients in a data processing system. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing circuit, the circuit comprising:
an equalizer circuit including a filter operable to filter a series of samples based at least in part on a filter coefficient and to provide a corresponding series of filtered samples;
a data detection circuit including:
a core data detector circuit operable to perform a data detection process on the series of filtered samples and to provide a most likely path and a next most likely path; and
a coefficient determination circuit operable to update the filter coefficient based at least in part on the most likely path and the next most likely path.

2. The data processing circuit of claim 1, wherein the core data detector circuit is selected from a group consisting of: a Viterbi algorithm detector circuit and a maximum a posteriori detector circuit.

3. The data processing circuit of claim 1, wherein the coefficient determination circuit is operable to:
calculate a difference between the most likely path and the next most likely path, wherein updating the filter coefficient based at least in part on the difference between the most likely path and the next most likely path.

4. The data processing circuit of claim 3, wherein the difference between the most likely path and the next most likely path is an angle between the most likely path and the next most likely path.

5. The data processing circuit of claim 4, wherein the coefficient determination circuit is operable to:
compare the most likely path with an expected most likely path to determine that the most likely path is correct; and
based upon the determination that the most likely path is correct, the coefficient determination circuit is further operable to increase the angle between the most likely path and the next most likely path, wherein the updated filter coefficient reflects the increase in the angle between the most likely path and the next most likely path.

6. The data processing circuit of claim 4, wherein the coefficient determination circuit is operable to:
compare the most likely path with an expected most likely path to determine that the most likely path is incorrect; and
based upon the determination that the most likely path is incorrect, the coefficient determination circuit is further operable to decrease the angle between the most likely path and the next most likely path until the most likely path and the next most likely path are switched, wherein the updated filter coefficient reflects the decrease in the angle between the most likely path and the next most likely path.

7. The data processing circuit of claim 3, wherein the coefficient determination circuit is operable to:
calculate a first error gradient value for the most likely path based on the difference between the most likely path and the next most likely path; and
calculate a second error gradient value for the next most likely path based on the difference between the most likely path and the next most likely path.

8. The data processing circuit of claim 7, wherein the coefficient determination circuit is operable to:
calculate a first updated branch metric for the most likely path based on the first error gradient value; and
calculate a second updated branch metric for the next most likely path based on the second error gradient value.

9. The data processing circuit of claim 7, wherein the coefficient determination circuit is operable to:
calculate a first updated variance for the most likely path based on the first error gradient value; and
calculate a second updated variance for the next most likely path based on the second error gradient value.

10. The data processing circuit of claim 3, wherein the coefficient determination circuit is operable to:
calculate an error gradient value based on the difference between the most likely path and the next most likely path; and
calculate the filter coefficient based on the error gradient.

11. The data processing circuit of claim 1, wherein the data processing circuit is implemented as part of a storage device.

12. The data processing circuit of claim 1, wherein the data processing circuit is implemented as part of a data transmission device.

13. The data processing circuit of claim 1, wherein the data processing circuit is implemented in an integrated circuit.

14. A method for equalizer optimization, the method comprising:
receiving a series of samples;
performing an equalization on the series of samples to yield a series of filtered samples, wherein the equalization is governed at least in part by a filter coefficient;
performing a Viterbi algorithm data detection on the series of filtered samples to yield a most likely path and a next most likely path;
calculating an angle between the most likely path and the next most likely path;
comparing the most likely path with an expected most likely path to determine that the most likely path is correct;
based upon the determination that the most likely path is correct, increasing the angle between the most likely path and the next most likely path; and
calculating the filter coefficient based at least in part in the increased angle between the most likely path and the next most likely path.

15. The method of claim 14, wherein calculating the filter coefficient includes:
calculating an error gradient value based on the angle between the most likely path and the next most likely path, wherein the filter coefficient is calculated based at least in part on the error gradient.

16. The method of claim 14, wherein the method further comprises:
calculating a first error gradient value for the most likely path based on the difference between the most likely path and the next most likely path; and
calculating a second error gradient value for the next most likely path based on the difference between the most likely path and the next most likely path.

17. The method of claim 16, wherein the method further comprises:
calculating a first updated branch metric for the most likely path based on the first error gradient value; and
calculating a second updated branch metric for the next most likely path based on the second error gradient value.

18. The method of claim 16, wherein the method further comprises:
calculating a first updated variance for the most likely path based on the first error gradient value; and
calculating a second updated variance for the next most likely path based on the second error gradient value.

19. A storage device, the storage device comprising:
a storage medium operable to maintain information;
a read head disposed in relation to the storage medium and operable to sense the information and to provide an analog signal corresponding to the information;
an analog front end circuit operable to convert converter the analog signal into a corresponding series of digital samples;
a read circuit comprising:
an equalizer circuit including a filter operable to filter the series of digital samples based at least in part on a filter coefficient and to provide a corresponding series of filtered samples;
a data detection circuit including:
a core data detector circuit operable to perform a data detection process on the series of filtered samples and to provide a most likely path and a next most likely path; and
a coefficient determination circuit operable to update the filter coefficient based at least in part on the most likely path and the next most likely path.

20. The storage device of claim 19, wherein the coefficient determination circuit is operable to:
calculate an angle between the most likely path and the next most likely path, wherein updating the filter coefficient based at least in part on the angle;

compare the most likely path with an expected most likely path to determine that the most likely path is correct; and based upon the determination that the most likely path is correct, the coefficient determination circuit is further operable to increase the angle between the most likely path and the next most likely path, wherein the updated filter coefficient reflects the increase in the angle between the most likely path and the next most likely path.

\* \* \* \* \*